M. J. WIGHTMAN

Jan. 13, 1931. MECHANICAL STOKER Re. 17,925

Original Filed May 10, 1924 8 Sheets-Sheet 1

INVENTOR
Merle J. Wightman
BY Merrell C. Clay
his ATTORNEY

M. J. WIGHTMAN
MECHANICAL STOKER
Jan. 13, 1931. Re. 17,925
Original Filed May 10, 1924 8 Sheets-Sheet 2
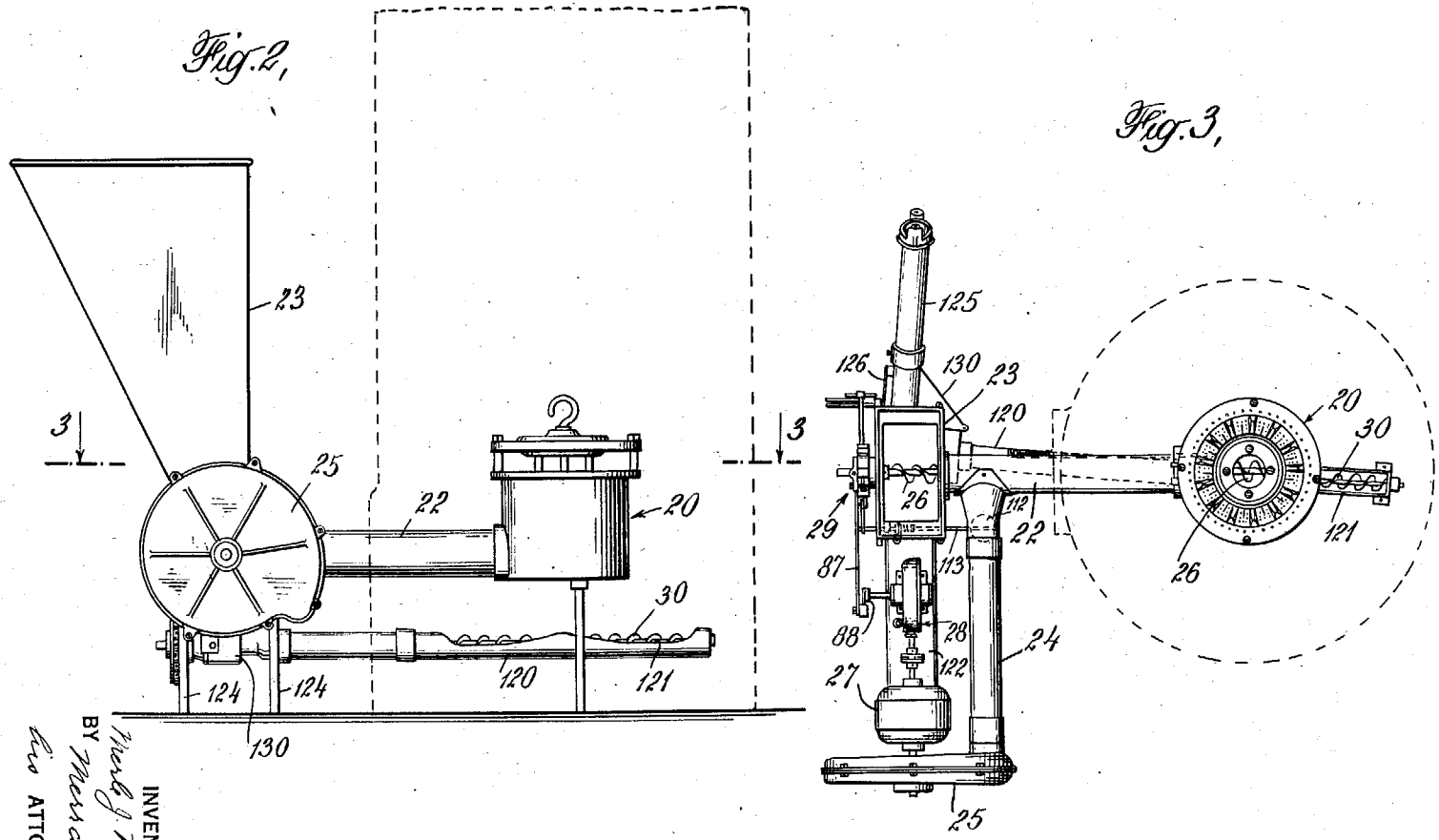
INVENTOR
Merle J. Wightman
BY Merrill E. Clark
his ATTORNEY M. J. WIGHTMAN
Jan. 13, 1931. MECHANICAL STOKER Re. 17,925
Original Filed May 10, 1924 8 Sheets-Sheet 3
Fig. 4,
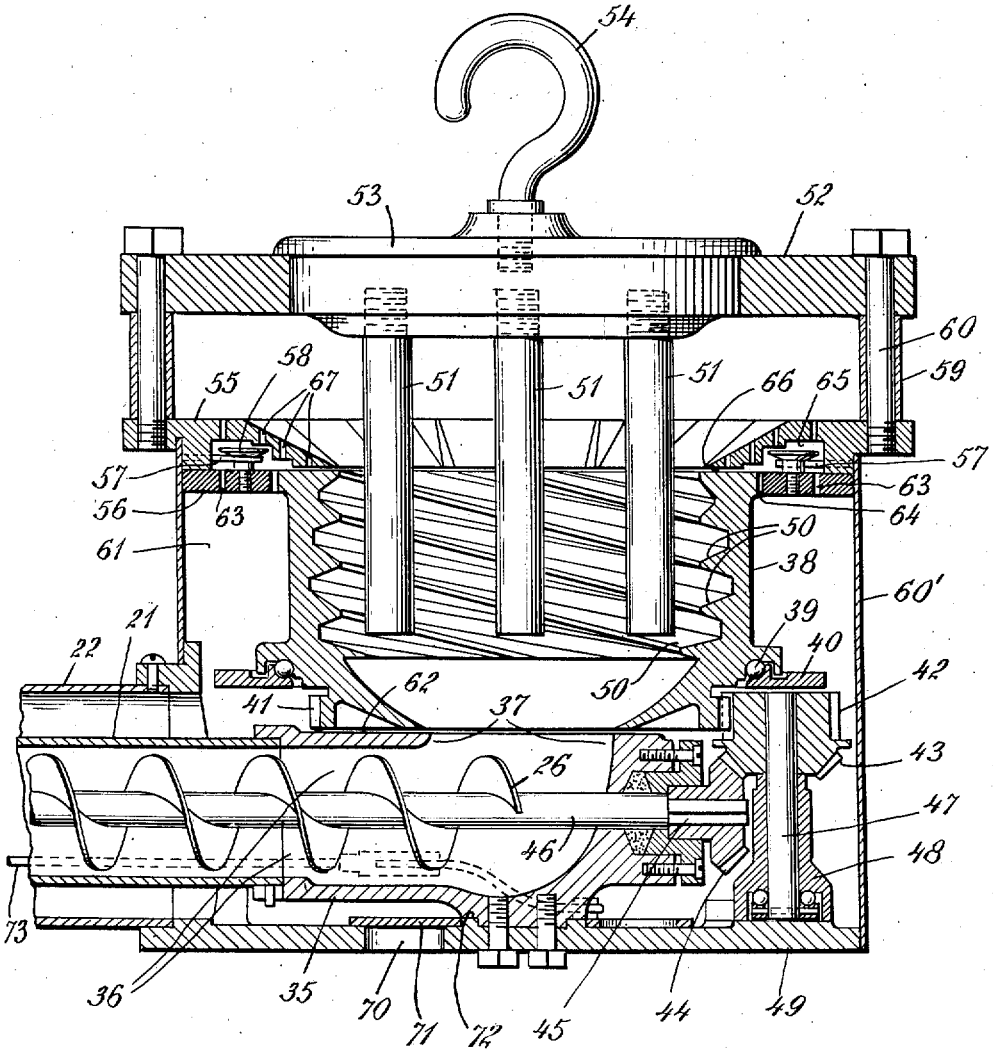
Fig. 16.
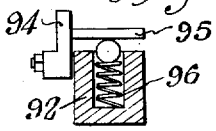
INVENTOR
Merle J. Wightman
BY Murrell E. Clay
his ATTORNEY M. J. WIGHTMAN
Jan. 13, 1931. MECHANICAL STOKER Re. 17,925
Original Filed May 10, 1924 8 Sheets-Sheet 4
Fig. 5,
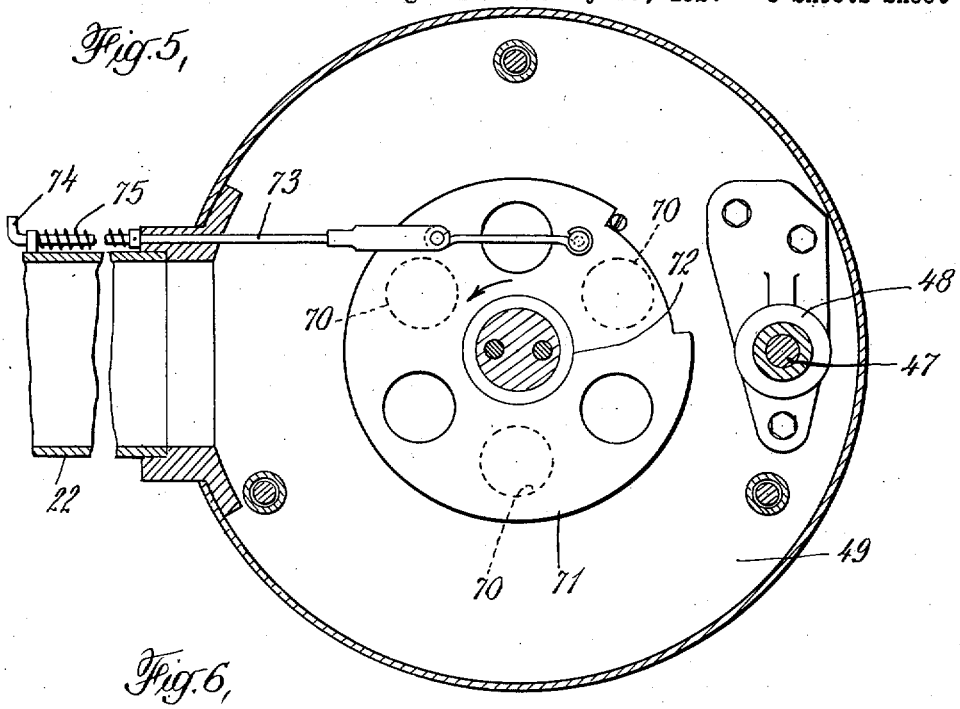
Fig. 6,
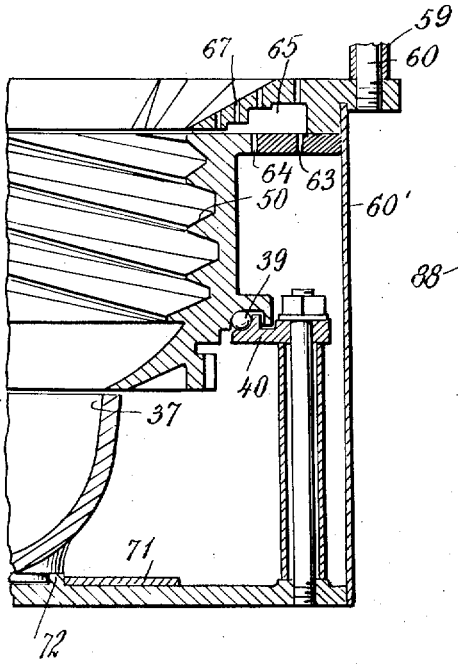
Fig. 7,
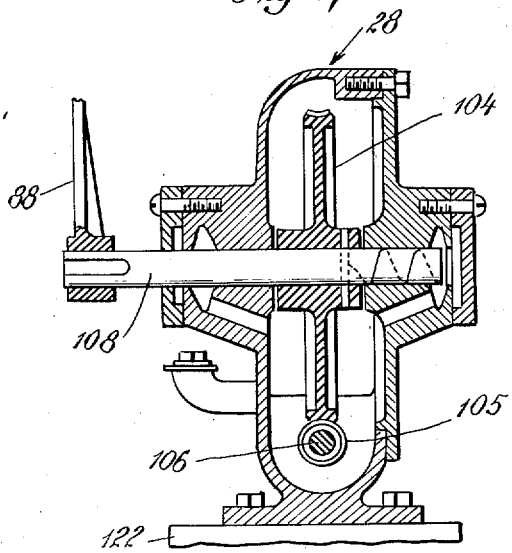
INVENTOR
Merle J. Wightman
BY Merrell E. Clark
his ATTORNEY M. J. WIGHTMAN
Jan. 13, 1931. MECHANICAL STOKER Re. 17,925
Original Filed May 10, 1924 8 Sheets-Sheet 5
Fig. 8,
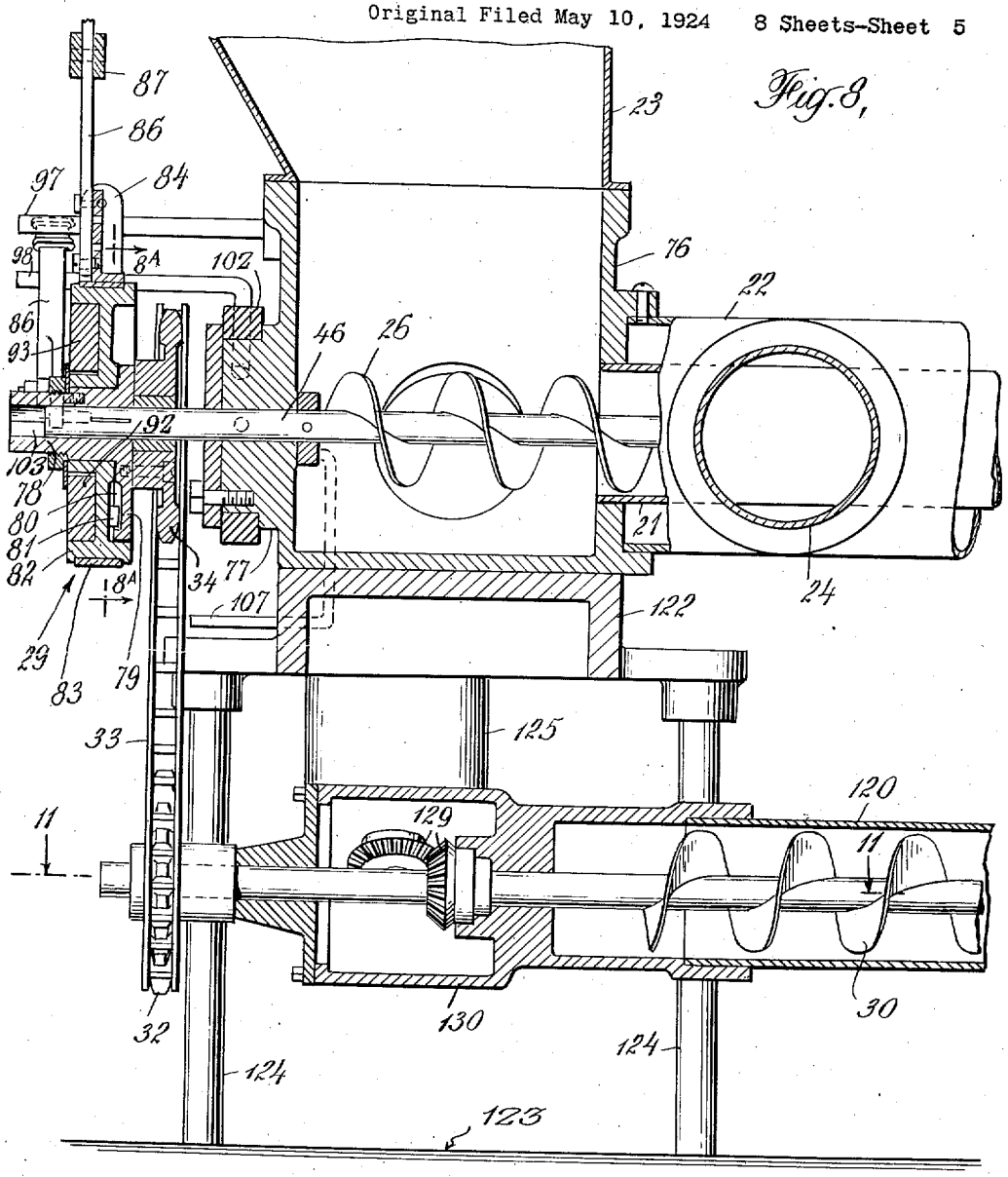
Fig. 8A.
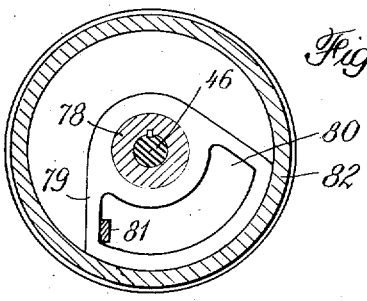
INVENTOR
Merle J. Wightman
BY Merrell C. Clay
his ATTORNEY

M. J. WIGHTMAN

MECHANICAL STOKER

Jan. 13, 1931.

Re. 17,925

Original Filed May 10, 1924 8 Sheets-Sheet 6

INVENTOR
Merle J. Wightman
BY Merrell E. Clapp
his ATTORNEY

M. J. WIGHTMAN
MECHANICAL STOKER
Jan. 13, 1931.
Re. 17,925
Original Filed May 10, 1924 8 Sheets-Sheet 7
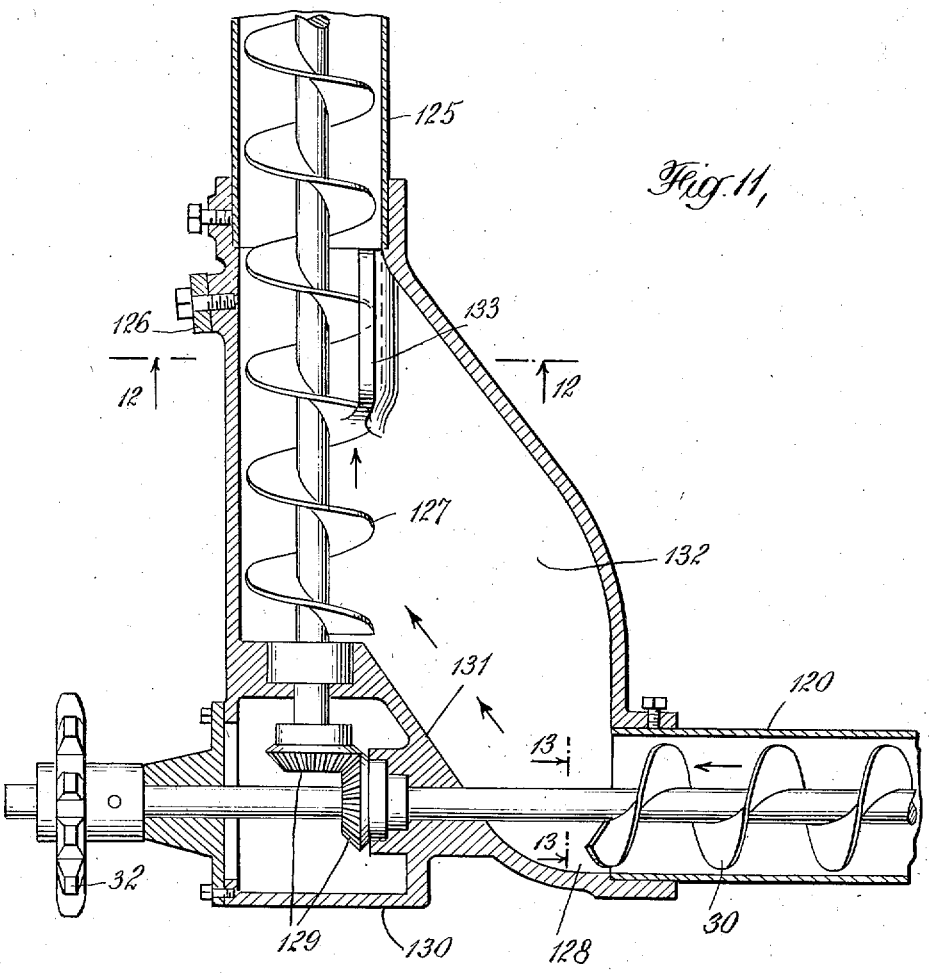
Fig. 11,
Fig. 12,
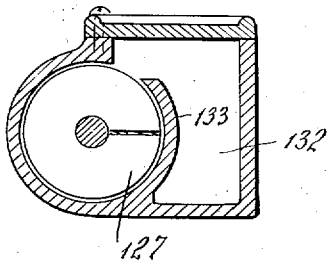
Fig. 13,
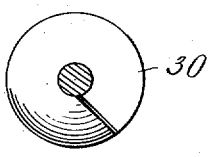
INVENTOR
Merle J. Wightman
BY Merrell E. Clark
his ATTORNEY M. J. WIGHTMAN
MECHANICAL STOKER
Jan. 13, 1931.
Re. 17,925
Original Filed May 10, 1924 8 Sheets-Sheet 8
Fig. 14,
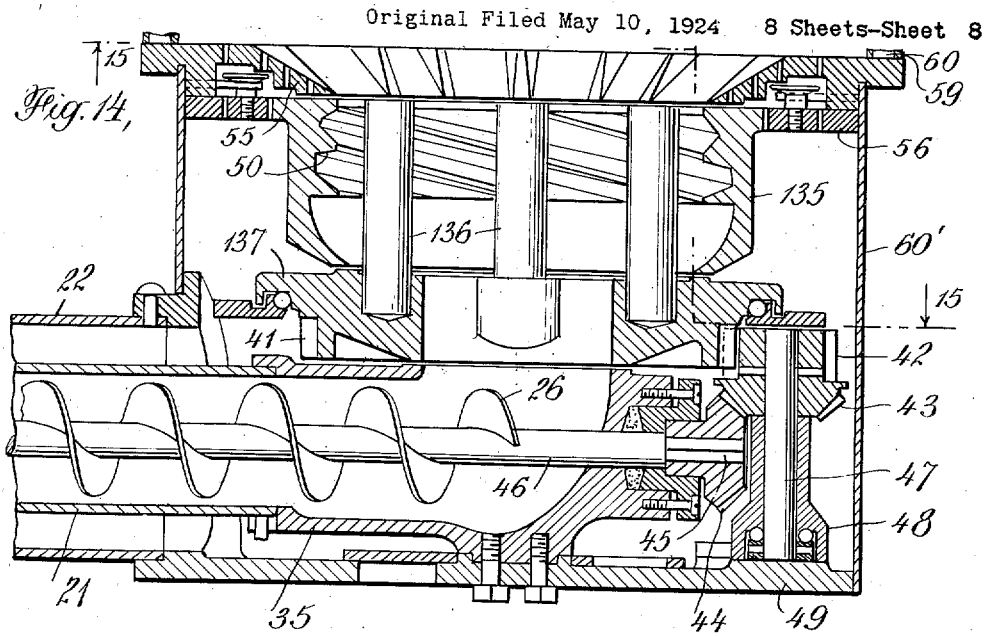
Fig. 15,
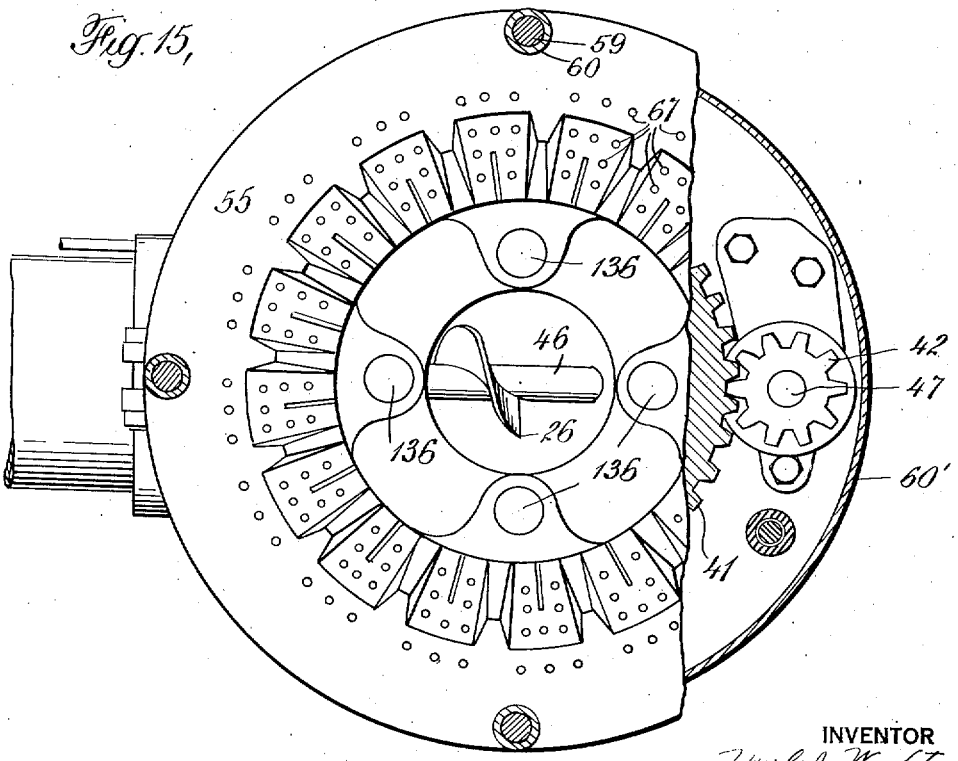
INVENTOR
Merle J. Wightman
BY Merrell E. Clapp
his ATTORNEY Reissued Jan. 13, 1931

Re. 17,925

UNITED STATES PATENT OFFICE

MERLE J. WIGHTMAN, OF SEATTLE, WASHINGTON, ASSIGNOR TO DOMESTIC STOKER COMPANY, OF NEW YORK, N. Y., A CORPORATION OF DELAWARE

MECHANICAL STOKER

Original No. 1,703,130, dated February 26, 1929, Serial No. 712,194, filed May 10, 1924. Application for reissue filed November 4, 1930. Serial No. 493,444.

My invention relates generally to mechanical fuel stokers and more particularly to a combined stoking device and burner especially adapted for use with solid fuel in furnaces of the type used in heating residences or in other relatively small installations.

A general object of the invention is to provide an apparatus which will automatically feed and burn the cheaper forms of coal with a minimum degree of attention and in such manner as to provide a substantially complete or perfect combustion thereof and an efficient application and use of the heat thus obtained. A further object of the invention is to provide means operated in conjunction with the stoking and burner mechanism for removing the ashes as they are formed and depositing them in a suitable receptacle outside the furnace.

The invention includes an improved burner of the underfeed type having means for intermixing the heated and incandescent coal at the uppermost part of the fire bed with the incoming fuel mass beneath. In combination with the burner a baffle member is provided above the burner for deflecting heat waves against the outermost portions of the fuel layer to insure the complete combustion thereof and against the side walls of the fire pot chamber, in order to distribute and make the most efficient use of the heat obtained.

In a preferred form of the invention the improved burner includes a rotatably mounted annular fire pot member having its inner surface formed to move the directly engaged fuel particles downwardly into the fresh fuel to produce a preliminary gasification and coking of the main body of incoming fuel. A group of rod-like members extends into the fuel mass from the baffle member and prevents the mass as a whole from rotating and thereby facilitates the intermixing action of the annular member.

The invention includes an intermittently operated burner feeding device having an adjustable and intermittent clutch connection with an electric motor or other suitable source of power. The motor serves also to drive a fan or blower for forcing a draft of air into a jacketed space enclosing the fire pot in order to cool the operating parts, preheat the air and supply heated air to the burning upper portions of the fuel mass to assist in the complete combustion thereof. An ash-removing conveyer forms a part of the general organization of structure and is arranged to be driven by the motor at a controlled speed corresponding to that of the fuel feeding device.

Another feature of the invention includes cooperating adjusting means providing for varying the speed of the feeding operation and at the same time varying the volume of air delivered by the blower in a ratio to the fuel feeding operation which can be itself varied in secondary adjustments to suit the draft requirements of different fuels.

Other features of the invention include a removable grid for the combustion zone of the fire pot; a removable unitary bearing structure in which a driving connection between the fuel feeding device and the rotatable fire pot is journaled; means for removing accumulated dust from the air jacket space; and driving clutch mechanism for the feeding device which provides for manual oscillation of the feed mechanism at will for the purpose of dislodging obstructions.

Still other features of the invention will be hereinafter referred to.

In the drawings,

Figure 2 is a view in side elevation on a reduced scale of the apparatus shown in Figure 1.

Figure 3 is a plan view of the apparatus shown in Figure 2 taken on the line 3—3.

Figure 4 is a view in vertical section of a burner construction forming part of the invention.

Figure 5 is a view in horizontal section of the lower part of the burner, showing a cleanout device.

Figure 6 is a sectional view showing a portion of the burner and a support for the framework therein.

Figure 7 is a sectional view of the reducing gear taken on the line 7—7 of Figure 1.

Figure 8 is a vertical section on an enlarged scale taken approximately on the line 8—8 of Figure 1.

Figure 8A is a sectional view taken on the line 8A—8A of Figure 8.

Figure 11 is a view in section showing ash removing mechanism forming part of the invention and taken on the line 11—11 in Figure 1.

Figure 12 is a view in cross-section showing a detail and taken on the line 12—12 of Figure 11.

Figure 13 is a cross-section taken on the line 13—13 of Figure 11.

Figure 14 is a view similar to Figure 4 showing a modified form of burner mechanism.

Figure 15 is a plan view, partly in section, of the device shown in Figure 14.

Figure 16 is a sectional view on an enlarged scale showing a detail of the clutch mechanism.

Figure 1:
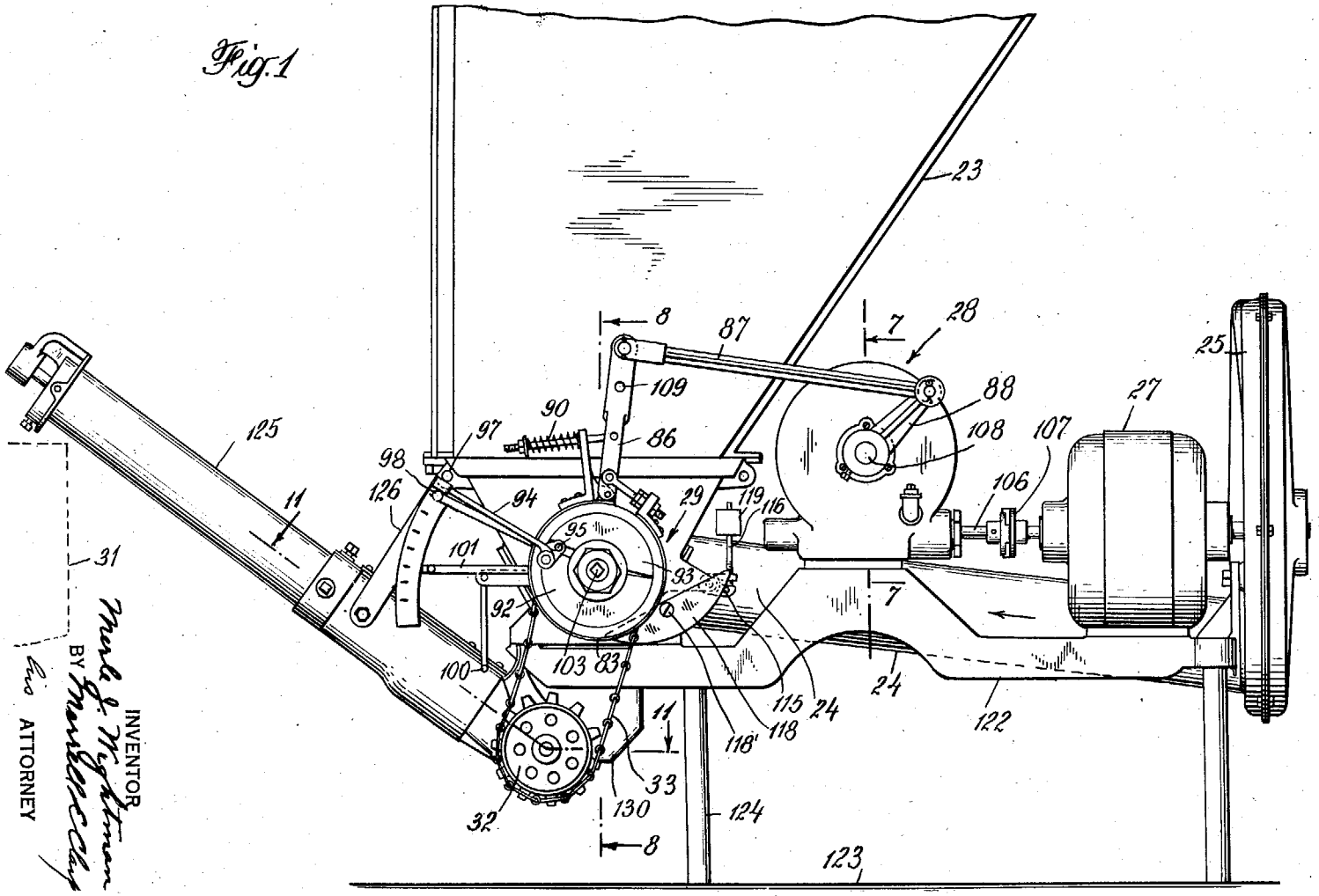
Figure 1 is a view in end elevation (with an unimportant part broken away) of a fuel handling apparatus embodying the invention.

Referring to the drawings for a more detailed description of the invention, the general organization of structure includes a burner 20 connected through the concentrically disposed tubular members 21 and 22 with a fuel hopper 23 and the outlet pipe 24 of an air blower 25. The inner tubular member 21 is fitted with a screw conveyor 26 for feeding fuel from the hopper 23 into the base portion of the burner or fire pot 20. In order to operate the fuel feeding device and the blower an electric motor 27 is directly coupled to the blower 25 and is indirectly connected to the shaft of the fuel feeding conveyor 26 through a reducing gear set 28 and an intermittently acting clutch device 29.

Another element of the general organization of structure resides in an ash-removing device which includes a screw conveyor 30 mounted beneath the draft conduit 22 and extending into the base of the furnace beneath the fire pot 20 as is shown in Figure 2 of the drawings. At a point beneath the hopper 23 the ash conveyor turns off at right angles and inclines upwardly to deliver ashes into a suitable receptacle 31 as indicated in Figure 1. A sprocket-wheel 32 on the end of the ash conveyor shaft is connected through a sprocket chain 33 with a driving sprocket-wheel 34 on the shaft of the fuel conveyor 26 so that the ash conveyor is driven in exact accordance with the operation of the fuel feed conveyor.

Taking up the various elements of the general structure the burner or fire pot structure 20 will be first described. Referring to Figure 4 of the drawing the fire pot structure proper includes a stationary base member 35 having a horizontal passageway 36 in which the delivery end of the conveyor 26 is received, and an upwardly directed outlet 37 through which the fuel is forced by the action of the conveyor into a chamber formed by a rotatable annular body member 38. The annular member 38 is mounted for rotation on ball bearings 39 rolling in a raceway formed in the annular track member 40 and is provided with an integrally formed set of gear teeth 41 which mesh with a driving spur gear 42. The spur gear 42 is provided with a bevel spur gear 43 which meshes in turn with a bevel spur gear 44 carried on the squared end 45 of the shaft 46 of the conveyor 26. It will be seen that the conveyor shaft 46 passes through and is journaled in the wall of the base member 35 opposite the passageway 36. The combined spur gear 42 and beveled spur gear 43 are mounted on a shaft 47 journaled in a support 48 which is directly attached to a base or floor member 49 and provides a unitary driving connection between the conveyor shaft and the annular member 38 which can be readily removed for inspection or repair when desired.

An important feature of the invention resides in the particular construction of the annular body member 38 of the general fire pot structure. It will be seen that the inner surface of the annular member 38 is provided with a series of helically formed cam members 50, which in the rotation of the annular member in a counterclockwise direction, operate to depress and intermix engaged heated particles of the mass of fuel contained within the annular member with the mass of incoming fresh and cool fuel entering from the conveyor discharge outlet 37.

In order to prevent the rotation of the mass of fuel as a whole and to thereby facilitate the depressing and intermixing action of the rotating cam members 50, a group of rodlike members 51 are so supported as to project into the mass of fuel and by reason of their fixed position prevent rotation thereof. The rod members 51 may be conveniently supported by a baffle plate 52 having a removable central portion 53 from which the rods 51 depend as is clearly shown in Figure 4 of the drawing. For convenience in removing the rods 51 from their position for any purpose, the supporting plate 53 may be removed from its position in the baffle plate through the use of a hook member 54 attached thereto.

It will be seen that the mass of fuel is gradually fed upwardly through the main body portion of the fire pot member to a combustion zone at the uppermost part thereof and in order to facilitate the combustion of the fuel in the most effective manner a grid member 55 is provided which takes the form of an annular perforated and slotted rim with respect to the annular member 38. The slots which are radially disposed, as shown in Figure 15, permit the rim to expand and contract readily in response to temperature changes. The grid member 55 is removably engaged with a frame member 56 of the fire pot structure and is provided with inwardly projecting pin members 57 which upon the rotation of the grid member can be moved into or out of wedging engagement with conical lower surfaces formed on the heads of retaining screws 58 carried by the frame member 56. It will be seen that with this arrangement of structure the incandescent fuel is gradually worked outwardly over the upper surface of the grid 55 until it has been entirely consumed and the residue has fallen over the outer edge of the grid into the space surrounding and beneath the fire pot structure.

The combustion of the fuel resting on the grid member is further facilitated by the action of the baffle plate 52. The position of the baffle member 52 is such as to reflect heat waves inwardly and outwardly across the fuel resting on the grid to thereby insure the complete combustion of the fuel in its movement outwardly across the grid and also to reflect heat waves outwardly between the baffle and grid members against the inner surface of the furnace chamber. The baffle member may be conveniently supported on the grid member through the use of spacing sleeves 59 and bolts 60.

In order to produce a suitable draft of air through the burning fuel to facilitate the combustion of the fuel, the fire pot structure is enclosed in a jacket or casing 60′ which is spaced therefrom to provide an air chamber or reservoir 61 into which air under pressure is forced through the conduit member 22 already referred to. A portion of air delivered from the conduit 22 enters the lower portion of the mass of fuel contained in the annular member 38 through a narrow slit or opening 62 between the lower extremity of the annular member 38 and the base member 35 of the fire pot structure. The greater portion, however, of the air entering the jacket 60′, from the conduit 22 passes into the chamber 61 where it is heated by contact with the hot body member 38 of the fire pot and then passes through ports 63 in the frame member 56 and through the annular opening 64 between the frame member 56 and the annular member 38 into a space 65 beneath the perforated grid member 55. The air arriving in the space 65 is still further heated and then passes through the annular slit or opening 66 between the upper extremity of the annular member 38 and the grid member 55 and also through a series of ports or passages 67 formed in the grid member 55 into the mass of incandescent fuel resting on the upper surface of the grid member. It will be seen that with this structural arrangement air is supplied to the main body of fuel contained in the annular member 38 and a still greater supply of air is supplied, after being preheated, to the incandescent fuel in the combustion zone adjacent to the rim or grid member 55. With the forced draft which is thus provided a thorough combustion of inferior grades of fuel can be produced so that the burner as a whole operates with a high degree of efficiency.

In order to clean out the jacket chamber surrounding the operating parts of the fire pot if an accumulation of dust may have been produced therein, clean-out openings 70 are provided in the floor plate 49 of the device and are normally covered by a shutter or cover plate 71 which is rotatably mounted on an annular stud 72 on the upper surface of the floor plate 49 and can be rotated into or out of closing relation to the openings 70 by means of a rod 73 operable from a handle member 74 and normally moved into closed position by the action of a spring 75. It will be seen that when the cover plate 71 is moved to open position that a draft of air entering from the air conduit 22 will blow any accumulation of dust that may have gathered in the jacket chamber outwardly through the openings 70.

Figure 9:
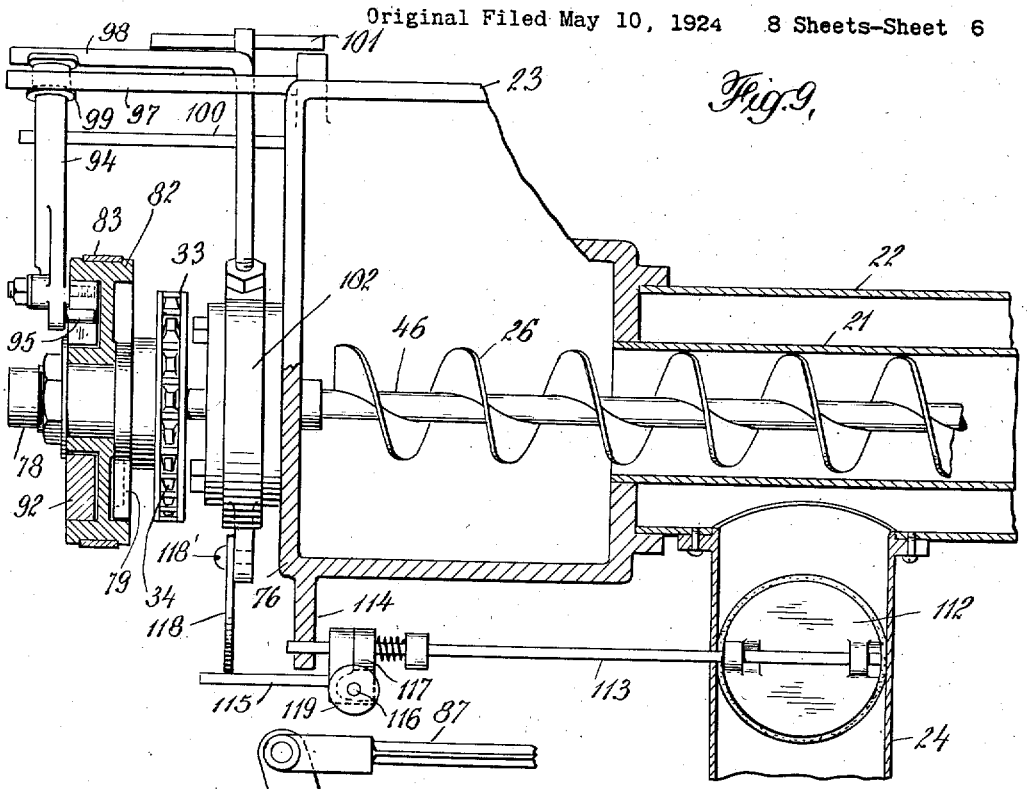
Figure 9 is a horizontal section of the device shown in Figure 8.

The mechanism employed for feeding fuel from the hopper 25 into the burner 20 is arranged to intermittently rotate the screw conveyor 26 through a predetermined fractional part of a revolution with each operating movement. Referring to Figures 8 and 9 of the drawings it will be seen that the conveyor shaft 46 passes through the reduced base portion 76 of the hopper 25 and is journaled in a boss 77 formed on the forward face of the hopper base. The outer end of the conveyor shaft 46 is provided with driving clutch mechanism indicated generally at 29 and illustrated particularly in Figures, 1, 8, 9 and 10 of the drawing.

Referring to this clutch mechanism, the sleeve 78, which is provided with the flange 79, is keyed to the conveyor operating shaft 46. This sleeve, as shown in Figure 8A, has a sector shaped gap 80 in which is located the driving lug 81 which is secured to the drum 82. By means presently to be described the drum 82 is given an oscillatory movement in which it moves a greater distance on its forward stroke than upon its return. The difference between its two strokes, which may be adjusted as will be explained later, is what determines the extent to which the flange 78, and hence the conveyor operating shaft 46, will be advanced by the driving lug 81 at each complete oscillation of the clutch mechanism. Obviously, if the forward and return strokes of the lug 81 were equal, that lug would merely oscillate back and forth in the sector-shaped gap of the flange 79 without advancing the flange or the conveyor shaft 46 to which it is secured.

Figure 10:
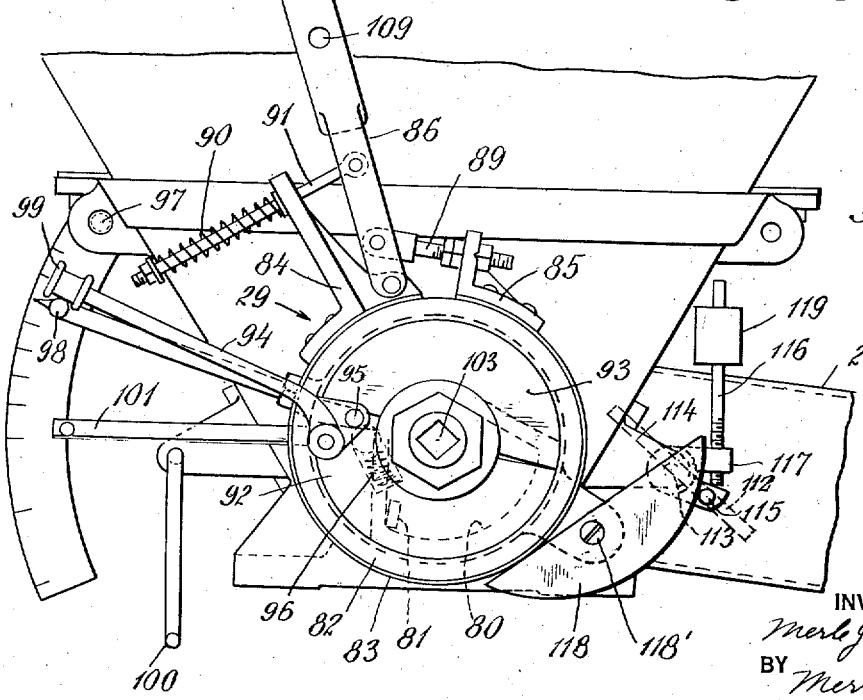
Figure 10 is a front elevation on an enlarged scale of clutch driving device shown in Figure 1.

The means for oscillating the drum 82 as above stated will now be described. Surrounding the drum 82 is the split band 83 upon the two ends of which are secured the brackets 84 and 85. To the bracket 84 is pivoted one end of the clutch operating arm 86 which at its other end is pivoted to the connecting rod 87 operated by the motor driven crank 88. The arm 86 is also connected to the bracket 85 by means of the link 89. As a result of this construction, as the arm 86 is moved forwardly or in a counter-clockwise direction as viewed in Figure 10, it tightens the band 83 on the drum 82 and carries the band and drum with it. So, also, the spring 90, which is interposed between the bracket 84 and the end of the rod 91, exerts sufficient force tending to move the arm toward the bracket 84 that even upon the return (clock-wise) movement of the arm 86 the band 83 will grip the drum 82 with sufficient friction to carry the drum back with it, if the return movement of the drum is unobstructed.

In order that there may be the required difference between the forward and return strokes or movements of the drum 82 to effect the desired advance of the conveyor shaft, I provide means for obstructing the return movement of the drum 82 at any desired point on the return movement of the band 83 and arm 86. These means comprise the two segmental friction brake members 92, 93 located within the flange of the drum 82. The lever or regulating arm 94 is pivoted to the brake member, 92, and has a projecting pin 95 adapted to contact with the other brake member 93. The spring 96 normally presses against the lever 94 in such a way as to tend to separate the adjacent edges of the two brake members and thus to expand them into frictional engagement with the inner surface of the flange of drum 82. A fixed abutment 97 and an adjustable abutment 98 are provided for limiting the movement of the lever 94, which lever, as will now appear, operates to limit the rotary movement of the brake 92, 93 as a whole, as well as to control its frictional engagement with the drum 82.

Assume now that the parts are at the beginning of their forward stroke. The cushioned end 99 of lever 94 will then be in contact with the fixed abutment 97. The movement of the arm 86 in its counter-clockwise (forward) direction will, for reasons previously stated, carry with it the band 83 and drum 82, and also the brake members 92, 93 (which are pressed into frictional engagement with the drum 82 by the spring 96), and the brake controlling lever 94. If, now, the adjustable abutment 98 were not so placed as to intercept the lever 94 in its forward movement, all of the parts above mentioned, including the drum 82 and its driving lug 81, would oscillate back and forth together, the return stroke of each being equal to its forward stroke. The result would be, as before stated, that the conveyor shaft would not be advanced at all. However, when the abutment 98 is placed in an intermediate position, as shown, for example, in Figure 10, the end 99 of lever 94 is arrested by it prior to the completion of the forward stroke of arm 86. The result is that the brake also is arrested, its frictional engagement with drum 82 being lessened by the tendency of the lever 94 to move in a clockwise direction about its own pivot. The arm 86, band 83 and drum 82, however, continue on to the completion of the forward stroke. At the commencement of the return stroke the spring 96 again becomes effective to bring the brake members into frictional engagement with the drum 82, and, the brake being now free to rotate with the drum, all of the parts start to return together. However, before the end of the return stroke the end 99 of lever 94 is arrested by the fixed abutment 97. This arrests the rotation of the brake members and, as will be obvious, at the same time increases the friction between the brake members and the drum 82 to a point where the friction between the brake and drum is greater than that between the drum and strap 83. Accordingly, the drum is arrested also. In subsequent operations of the clutch mechanism the same cycle is repeated. It is in this way that the return stroke of the drum is rendered of less extent than its forward stroke. Thus the distance between the abutments 97 and 98 measures the extent of the return stroke of the drum. The closer these abutments are together the less will be the return stroke of the drum and the greater the difference between its forward and return stroke. And as above suggested, the greater this difference the greater will be the advance of the conveyor operating shaft upon each operation of the clutch device. Thus the maximum rate of feed is obtained when the adjustable abutment 98 is in its uppermost position so that the lever 94 is not permitted any movement, and the minimum rate is determined by the location of a second fixed abutment 100. The adjustable abutment 98 may be placed anywhere between these two positions, depending upon the rate of feed desired. The position of the stop 98 may be fixed by a band screw 101 which is utilized to lock the band 102 on which the stop 98 is carried in fixed angular position. The band 102 is rotatably mounted on the boss 77 as is clearly shown in Figure 8 of the drawings.

The adjustable stop member 98 may, if desired, be left unlocked and free to be moved from a distance through a chain or other connection with a manual or thermostatic control device located in another part of the building in which the device is used.

The loose connection provided between the clutch drum 82 and the conveyor shaft through the gap 80 in the flange 79 affords an additional useful function and that is the capability of manually oscillating the conveyor shaft through a partial revolution for the purpose of dislodging clinkers or for any other purpose. To facilitate this a square recess 103 in the outer end of the conveyor shaft 46 provides for the introduction of the squared end of a crank or wrench for rocking the shaft. Should it be found desirable to increase the length of the normal operating stroke of the arm 86 the link 87 may be attached thereto at the position of the hole 109 instead of at the outer extremity of the arm.

In order to regulate the volume of air supplied to the burner through the draft conduit 22 a butterfly or damper valve 112 is provided in the air supply pipe 24 and a shaft 113 for adjusting the valve extends therefrom and is journaled in a bracket lug 114 on the hopper base member 76.

Provision is made for automatically adjusting the position of the valve 112 to accord with the position of the feed control arm 98 and the rate at which fuel is fed to the burner. For this purpose a crank device 115 is adjustably carried by the shaft 113 and is engaged by a screw 116 passing through an arm 117 fixed to the shaft. Rotation of the screw 116 is utilized to vary the angular relation of the crank 115 to the valve shaft 113. The automatic adjustment referred to is obtained by the cooperation of the crank 115 with a cam member 118 carried by the ring or band 102 which supports the feed control stop 98. It will be seen that the crank arm 115 is caused to engage and follow the contour of the cam 118 through the action of a weight 119 conveniently forming the head of the adjusting screw 116. Further adjustment of the relation between the air valve 112 and the feed control mechanism to suit the requirements of different fuel may be obtained by varying the angular position of the cam 118 on its support. This is achieved by loosening the screw 118′, adjusting the cam, and then locking the cam in adjusted position by turning the screw to its holding position. It will be seen that with the arrangement of adjusting mechanism shown any desired relation between the rate of feeding fuel and the rate of supply of air to the burner may be obtained, and that the adjustment of the feed control arm 86 automatically produces a corresponding adjustment of the air valve 112.

It will be observed that the burner 20 and a frame work 122 on which the motor 27 and other parts are mounted are raised above the floor 123 on posts 124 thereby placing the parts including the burner at a convenient level as well as providing room for the ash removing device beneath the other structural parts. It will be seen that the framework 122 and the parts carried thereby are placed to one side of the hopper 23 and in a relatively protected location beneath the overhang of the corresponding side of the hopper.

The ash removing device which has been generally referred to, includes the screw conveyor 30 which is located within the horizontal pipe or passage 120 and extends from the furnace ash pit to the transfer box 132. The pipe or casing 120 is cut away as at 121 to permit ashes to enter the casing and be engaged and removed by the conveyor.

The function of the transfer box 132 is to transfer the ashes from the action of the horizontal conveyor 30 to the action of a non-horizontal conveyor such as the upwardly inclined conveyor 127 located within the passage 125. This latter conveyor carries the ashes from the transfer box 132 to the ash can 31. The provision of the guide or baffle 131 within the transfer box facilitates the change of direction which the ashes are forced to take within the transfer box in passing, and the guard 133 (Figs. 11 and 12) serves to shear off large clinkers which may be carried into the transfer box by the horizontal conveyor 30.

It is, of course, important that means be provided to prevent the accumulation and crowding of large amounts of ashes within the transfer box, since such accumulation might clog the machine. To this end I so proportion the gears 129 (which as will be noted are protected from contact with the ashes) that the non-horizontal conveyor 127 rotates at a speed which is slightly more rapid than that of the horizontal conveyor 30.

A modified form of burner or fire pot structure is shown in Figures 14 and 15. In this modification the main body portion 135 of the fire pot structure is fixed against rotation while the rods 136 are given a rotative motion within the mass of fuel. The rods 136 are carried on a rotatable member 137 located between the member 135 and the base member 35 of the fire pot. In general this form of burner follows that shown in my prior Patent No. 1,454,697, May 8, 1923.

The general operation as a complete operating unit of the described apparatus may be briefly summed up as follows: The hopper 23 is filled with coal in a relatively finely divided grade such, for example, as the size known as "buckwheat". A fire having been kindled in the burner 20, current to the electric motor 27 is turned on and the blower 25 through its direct-coupled connection with the motor is started into operation. At the same time the crank 88 is set into rotation through the rotation of the worm wheel 104 in the reducing gear set 28 by the worm 105 directly driven from the motor shaft 106 through the flexible coupling 107, the crank 88 being mounted on the shaft 108 of the worm wheel 104.

The oscillation of the clutch operating arm through its operating connection with the crank 88, and the resulting intermittent operation of the fuel conveyor 26 has already been described. It will be clear that when once set into operation the fuel conveyor will continue to feed fuel to the burner, subject only to regulation of the rate of supply of fuel and air by variations in the position of the control arm, until the supply of fuel in the hopper has been exhausted or until the supply of power to the motor has been shut off.

The driving connection between the fuel conveyor and the rotatable burner structure produces the desirable intermixing of the hot incandescent fuel at the upper part of the fuel bed with the cooler incoming fuel below thus obtaining the desirable gasifying and coking effect which is an important feature of the invention.

The driving connection between the fuel conveyor shaft and the ash removing device insures the automatic removal of ashes so that the apparatus operates with a minimum degree of attention, requiring only the replenishing of the hopper with a fresh supply of fuel every two or three days and the substitution of an empty ash receptacle for a filled one at relatively infrequent intervals.

What is claimed is:—

1. In a heating plant for household use, a fire pot provided with a combustion zone in the uppermost part thereof, a screw conveyor for feeding fuel into the base portion of the fire pot and upwardly therethrough into said combustion zone, a screw conveyor mounted beneath the fuel feeding conveyor and extending substantially parallel thereto into a position beneath said fire pot to remove ashes falling therefrom, means for rotating the fuel feeding conveyor, and a driving connection between the outer end of the fuel feeding conveyor and the outer end of the ash removing conveyor.

2. In a heating plant, a fire pot supported above the base of a furnace chamber, a fuel hopper located outside the furnace, a tubular member connecting the hopper and the base of the fire pot, a screw conveyor in said tubular member operable to feed fuel from the hopper into the fire pot, a tubular member surrounding the fuel feeding member and spaced therefrom to provide a conduit through which air may be forced into the fire pot, an ash conveyor located beneath the air conduit and extending into the furnace to remove ashes discharged from the fire pot, a blower arranged to force air through the conduit, a motor having a direct driving connection with the blower, and a speed reducing drive connection between the motor and the fuel and ash conveyors.

3. In a burner construction for furnaces, a stationary base member provided with a fuel passageway having an upwardly directed discharge outlet, a rotatable annular body member provided on its inner surface with fuel engaging members operating in the rotation of the annular member to depress and intermix engaged heated fuel particles with fresh fuel entering the annular member from beneath, an annular grate member located at the upper edge of the rotatable body member, a baffle member supported above the grate member and arranged to deflect heat waves against fuel on the grate member and across the edge of the grate into the furnace chamber, and rod-like members depending from the baffle member and arranged to project into the fuel mass to prevent bodily rotation thereof.

4. In a burner construction for furnaces, a stationary base member provided with a fuel passageway having a laterally directed inlet and an upwardly directed outlet port, a screw conveyor operating in said inlet port with its shaft extending through and journaled in the wall of the base member, a rotatable annular burner body member provided on its inner surface with fuel engaging members operating in the rotation of the annular member to depress and intermix engaged heated fuel particles with fresh incoming fuel, an annular removable grate member located at the upper extremity of the annular body member and across which fuel is fed from the rotating body member, and means consisting of a removable unitary gear connection between the end of the conveyor shaft and the rotatable annular member.

5. In a stoker for a burner of the underfeed type, a fuel hopper, a pipe extending between the hopper and the base of the burner, a screw conveyor operating in the pipe for feeding fuel from the hopper to the burner, a clutch device carried by the conveyor shaft, a motor having a crank connection with the clutch device for intermittently driving the fuel conveyor, an ash remover including a screw conveyor mounted beneath and substantially parallel to the fuel conveyor, and a sprocket and chain driving connection between the fuel conveyor and the ash remover.

6. In a stoker for a burner of the underfeed type, a fuel hopper, a pipe extending between the hopper and the base of the burner, a screw conveyor operating in the pipe for feeding fuel from the hopper to the burner, a clutch device carried by the conveyor shaft, a motor having a crank connection with the clutch device for intermittently driving the fuel conveyor, an ash remover including a screw conveyor mounted beneath and substantially parallel to the fuel conveyor, a sprocket and chain driving connection between the fuel conveyor and the ash remover, and an extension to the ash remover projecting substantially at right angles and at an upward inclination to the ash remover proper.

7. In a solid fuel burner of the underfeed type, a fire pot, means for feeding fuel into the lower portion of the fire pot, means for depressing heated fuel particles in the combustion zone at the upper portion of the fire pot into contact with cooler fuel particles beneath, and a baffle plate mounted above the fire pot to deflect heat waves outwardly across the upper extremity thereof.

8. In a fuel burner of the underfeed type, a fire pot, an annular removable grate member adapted to be placed in the relation of an outwardly and radially extending flange to the upper edge of the fire pot, a support for the grate member, upstanding headed members on the support having the under sides of the heads in the form of inverted cones, and radially extending pins on the grate adapted to be forced into wedging engagement with the under sides of the heads when the grate is partially rotated to thereby lock the grate in place.

9. In a solid fuel burner of the underfeed type, a horizontally positioned screw fuel conveyor extending into the lower portion of the burner, a fuel stirring device rotatable about a vertical axis, a bevel pinion on the end of the conveyor shaft, said stirring device being provided with gear teeth, and a unitary and removable gear connection for said conveyor shaft and said stirring device comprising, a vertical counter shaft, an elongated bearing support for the counter shaft, and a combined bevel and spur gear member carried by the shaft and meshing with the bevel pinion on the conveyor shaft and with the gear teeth on the stirring device.

10. In a heating plant, a fire pot supported above the base of a furnace chamber, a fuel hopper located outside the furnace, a tubular member connecting the hopper and the base of the fire pot, a screw conveyor in said tubular member operable to feed fuel from the hopper into the fire pot, an air chamber surrounding said fire pot, a tubular member surrounding the fuel feeding member and spaced therefrom to provide a conduit through which air may be forced into the air chamber and therefrom into the fire pot, an ash conveyor located beneath the air conduit and extending into the furnace to remove ashes discharged from the fire pot, a blower arranged to force air through the conduit into said air chamber, an opening in the bottom of the air chamber normally closed by a shutter, actuating means connected to said shutter and adapted for manual operation whereby said shutter may be moved to expose said opening to permit the air blast in said chamber to blow out any dust that may accumulate, a motor having a direct driving connection with the blower, and a speed reducing drive connection between the motor and the fuel and ash conveyors.

11. In a heating plant, a fire pot supported above the base of a furnace chamber, a fuel hopper located outside the furnace, a tubular member connecting the hopper and the base of the fire pot, a screw conveyor in said tubular member operable to feed fuel from the hopper into the fire pot, a driving clutch device mounted on the conveyor shaft in such a manner as to permit oscillation of the conveyor shaft by hand independently of the clutch device, a tubular member surrounding the fuel feeding member and spaced therefrom to provide a conduit through which air may be forced into the fire pot, an ash conveyor located beneath the air conduit and extending into the furnace to remove ashes discharged from the fire pot, a blower arranged to force air through the conduit, a motor having a direct driving connection with the blower, and a speed reducing drive connection between the motor and the fuel and ash conveyors.

12. In a heating plant, an underfeed burner supported in a furnace, a fuel hopper positioned outside of the furnace, a conduit connecting the hopper with the lower portion of the burner, a conveyor in said conduit operable to feed fuel to the burner, means for supplying air to the burner, an ash conveyor for removing ashes discharged from the burner, an elevator for elevating the ashes outside of the furnace, said ash conveyor extending from said burner in the same direction and substantially parallel to the fuel conduit, a motor, said motor being operably connected outside of the furnace to the fuel conveyor and to the ash removing and elevating conveyors.

13. In a heating unit, an underfeed burner, a conduit adapted to conduct solid fuel to the lower portion of the burner, a conduit adapted to conduct air to the burner, an ash conveyor extending from said burner in a direction substantially parallel to the feed conduit, an ash elevator communicating with and projecting substantially at right angles and at an upward inclination from the ash conveyor, a motor, and means actuated by said motor for conveying fuel and ashes through said conduits and elevator.

14. In a heating unit, an underfeed burner, a conduit for conducting solid fuel to the lower portion of said burner, a blower, a conduit for conducting air from the blower to said burner, an ash conduit extending from said burner in a direction substantially parallel to said fuel conduit, a second ash conduit communicating with and projecting substantially at right angles and at an upward inclination from said first mentioned ash conduit, a motor, and means actuated by said motor for operating the blower and for operating conveyors in said fuel and ash conduits.

15. In a heating unit, an underfeed burner, a conveyor for conducting coal to the burner, a blower, a conduit for conducting air from the blower to the burner, a screw conveyor, positioned substantially parallel to the fuel conveyor, for conducting ashes from the burner, a second ash conveyor communicating with and extending at right angles and at an upward inclination from the first mentioned ash conveyor and provided with means for elevating the ashes, a motor, and means actuated by said motor for operating said blower and said coal and ash conveyors.

16. In a heating unit, an underfeed burner, a fuel conduit adapted to feed solid fuel to the lower portion of the burner, a conduit adapted to conduct air to the burner, an ash remover positioned beneath and substantially parallel to the fuel conveyor, an ash conveyor communicating with and extending substantially at right angles and at an upward inclination from the ash remover, a motor, and means actuated by said motor for conveying fuel through said fuel conduit and for withdrawing and elevating ashes in said ash remover and conveyor.

17. In a heating plant for household use, a fire pot provided with a combustion zone in the uppermost part thereof, a screw conveyor for feeding fuel into the base portion of the fire pot and upwardly therethrough into said combustion zone, a screw conveyor mounted beneath the fuel feeding conveyor and extending substantially parallel thereto into a position beneath said fire pot to remove ashes falling therefrom, a second ash conveyor communicating with and projecting substantially at right angles and in an upward inclination to said first ash conveyor, means for rotating the fuel feeding conveyor, and a driving connection between the outer end of the fuel feeding conveyor and the outer end of the ash removing conveyor.

18. In a heating plant, a fire pot supported above the base of a furnace chamber, a fuel hopper located outside the furnace, a tubular member connecting the hopper and the base of the fire pot, a screw conveyor in said tubular member operable to feed fuel from the hopper into the fire pot, a tubular member surrounding the fuel feeding member and spaced therefrom to provide a conduit through which air may be forced into the fire pot, an ash conveyor located beneath the air conduit and extending into the furnace to remove ashes discharged from the fire pot, a second ash conveyor in communication with the ash remover and projecting at substantially a right angle and at an inclination from it, a blower arranged to force air through the conduit, a motor having a direct driving connection with the blower, and a speed reducing drive connection between the motor and the fuel and ash conveyors.

19. In a heating plant, a fire pot supported in a furnace chamber, a fuel hopper located outside the furnace, a conduit connecting the hopper and the base of the fire pot, a conveyor in said conduit operable to feed fuel from the hopper into the fire pot, a conduit through which air may be forced into the fire pot, an ash conveyor extending into the furnace to remove ashes discharged from the fire pot, a blower arranged to force air through the air conduit, a motor operably connected to the blower and to the fuel and ash conveyors, and an ash elevator communicating with and projecting at an inclination from the ash remover and operably connected to said motor so as to convey ashes from the ash remover at a higher rate than they are delivered by it.

20. In a heating unit, an underfeed burner, a conduit adapted to conduct solid fuel to the lower portion of the burner, an air blower, a conduit adapted to conduct air from the blower to the burner, a conveyor extending in a direction substantially parallel to the fuel conduit for removing ashes from said burner, an ash elevator communicating with and projecting substantially at right angles and at an upward inclination from the ash conveyor, a motor, means actuated by said motor for operating said blower and the fuel and ash conveyors, and means actuated by said ash conveyor for operating said ash elevator.

21. In a heating unit, an underfeed burner, a fuel hopper, a conduit connecting the fuel hopper with the lower portion of the burner, a screw conveyor in said conduit for feeding fuel to the burner, an air blower, a conduit for conducting air from the blower to the burner, a screw conveyor for conveying ashes from the burner, said conveyor extending in the same direction and substantially parallel to said fuel conveyor, an ash elevator communicating with and projecting at substantially a right angle and in an upward inclination from said ash conveyor, a motor, means actuated by said motor for driving said screw conveyors and means actuated by said ash conveyor for driving said ash elevator.

In testimony whereof, I have signed my name to this specification this thirtieth day of October, 1930.

MERLE J. WIGHTMAN.